United States Patent [19]
Chandler

[11] Patent Number: 5,927,780
[45] Date of Patent: Jul. 27, 1999

[54] SWIVEL HOIST RING TO WEB SLING CONNECTOR

[75] Inventor: William Michael Chandler, Ward, Ark.

[73] Assignee: The Crosby Group, Inc., Tulsa, Okla.

[21] Appl. No.: 09/046,987

[22] Filed: Mar. 24, 1998

[51] Int. Cl.[6] .................................................. B66C 1/12
[52] U.S. Cl. .......................................... 294/82.11; 294/74
[58] Field of Search .............................. 294/1.1, 74, 82.1, 294/82.11, 89; 403/60, 78, 79, 164

[56]    References Cited

U.S. PATENT DOCUMENTS

| | | | |
|---|---|---|---|
| 2,396,790 | 3/1946 | Jensen | 294/82.11 |
| 2,427,926 | 9/1947 | Schroeder | 294/82.11 |
| 2,435,328 | 2/1948 | Smith | 294/82.11 |
| 2,811,378 | 10/1957 | Kalista | 287/91 |
| 3,224,185 | 12/1965 | Grim et al. | 59/86 |
| 3,343,862 | 9/1967 | Holmes | 294/74 |
| 3,583,750 | 6/1971 | Norton | 294/74 |
| 3,583,751 | 6/1971 | White | 294/82.11 |
| 3,827,514 | 8/1974 | Bradley | 294/82.1 |
| 4,074,519 | 2/1978 | Garrett | 59/95 |
| 4,530,534 | 7/1985 | Fredriksson | 294/82.11 |
| 4,572,562 | 2/1986 | Page | 294/74 |
| 4,622,721 | 11/1986 | Smetz et al. | 294/74 |
| 5,123,690 | 6/1992 | Bailey | 294/74 |
| 5,286,130 | 2/1994 | Mueller | 294/1.1 |
| 5,352,056 | 10/1994 | Chandler | 403/79 |
| 5,381,650 | 1/1995 | Garrett | 59/95 |
| 5,607,248 | 3/1997 | Hasse | 403/78 |
| 5,634,734 | 6/1997 | Schron, Jr. et al. | 403/78 |
| 5,651,573 | 7/1997 | Germain | 294/74 |
| 5,660,423 | 8/1997 | Herman et al. | 294/74 |
| 5,683,131 | 11/1997 | Lucas | 294/74 |

FOREIGN PATENT DOCUMENTS

| | | |
|---|---|---|
| 0664406A1 | 7/1995 | European Pat. Off. . |
| 1050789 | 12/1966 | United Kingdom . |
| WO 90/10803 | 9/1990 | WIPO . |

*Primary Examiner*—Dean J. Kramer
*Attorney, Agent, or Firm*—Head, Johnson & Kachigian

[57]    ABSTRACT

A swivel hoist ring to web sling connector. The connector includes a swivel hoist ring having a screw with a threaded shank for receiving a load and a body which receives the screw therethrough. A web sling includes a spool having a saddle to receive a fabric web sling. A frame has a first pair of legs connected to the sling spool and a second pair of legs which pivotally connect with the hoist ring body.

15 Claims, 4 Drawing Sheets

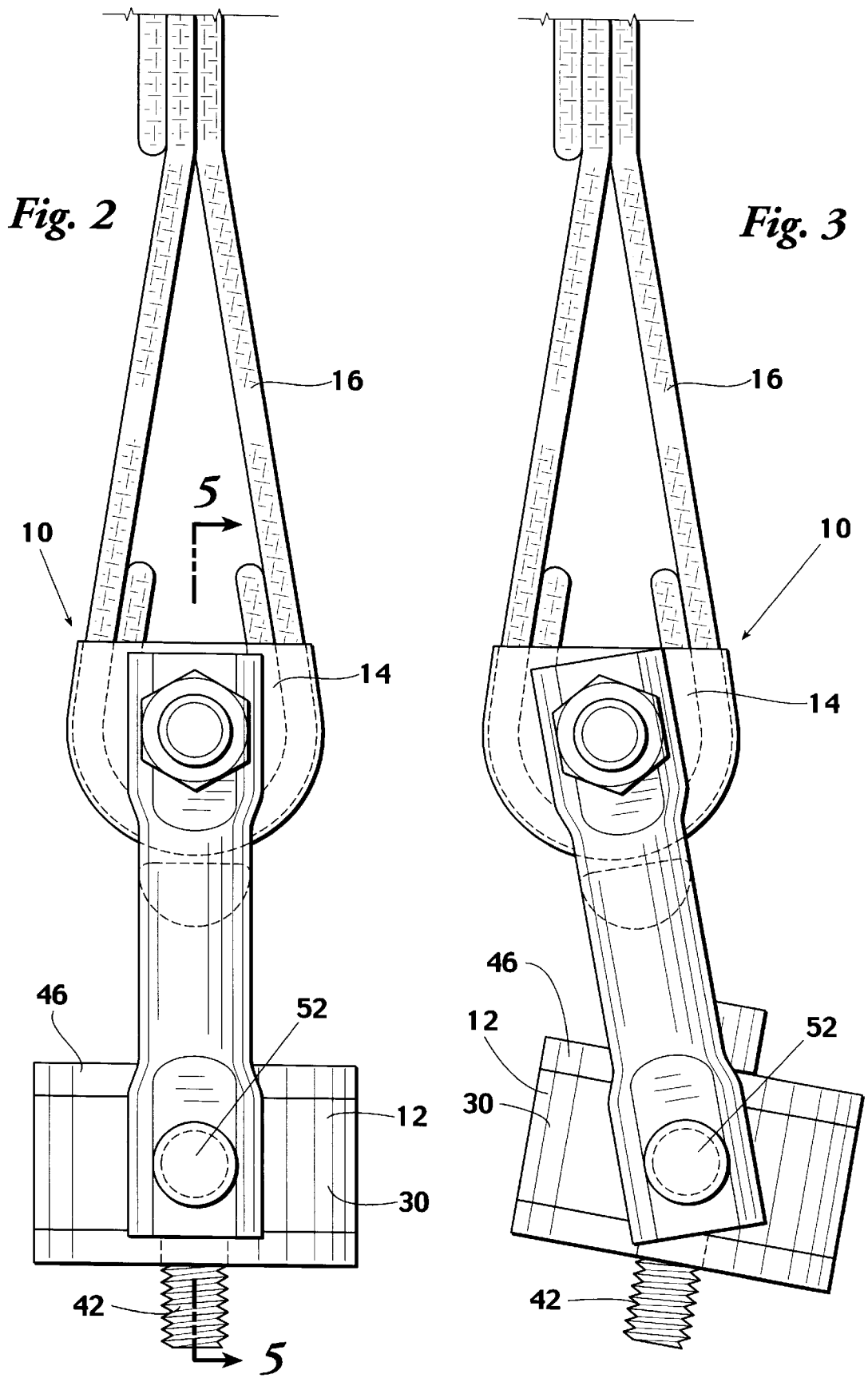

SWIVEL HOIST RING TO WEB SLING CONNECTOR

BACKGROUND OF THE INVENTION

1. Field of the Invention

The present invention is directed to a hoist ring fastener to web sling connector. In particular, the present invention is directed to a hoist ring to web sling connector having a unitary, integral frame so that a load to be suspended from a hoist ring may be lifted by the web sling.

2. Prior Art

Hoist ring fastening devices having a lower end which is threadably securable to a load and an upper eye member which is securable to a base are known. An example of a known hoist ring fastening device is shown in Assignee's U.S. Pat. No. 5,352,056, for a hoist ring with self-lock retaining ring. It may be desirable to use a 360° rotatable hoist ring having a 180° rotatable bail with web sling connector pin for the purpose of lifting with a threaded end of the hoist ring a threadably securable load.

While existing hoist rings may allow pivotal movement with a bail, they are not especially adapted for a fabric web sling.

Couplers for connecting a web-type sling made of fabric to a lifting apparatus are also known. The coupler in one design includes a clasp having a central saddle to receive a fabric web sling. An example of such a web sling coupler is shown in Assignee's U.S. Pat. No. 5,683,131.

There is a need to provide a combination connector for a hoist ring fastening device and a web sling. It is, therefore, a principal object and purpose of the present invention to provide a hoist ring fastening device to a web sling connector.

It is an additional object and purpose of the present invention to provide a 360° rotatable hoist ring having a 180° rotatable bail with a web sling connector pin for the purpose of lifting with a threaded end of the hoist ring a threadably securable load.

It is an additional object and purpose of the present invention to provide a hoist ring to web sling connector having a unitary, integral frame.

It is a further object and purpose of the present invention to provide a hoist ring to web sling connector having a frame which assists in concentrating the load toward the center of the hoist ring.

SUMMARY OF THE INVENTION

The present invention is directed to a hoist ring to web sling connector. The connector includes a hoist ring fastening device for receiving and connecting to a load and also includes a web sling adapted to connect to a fabric web.

The connector includes a unitary, integral frame. The frame includes a first pair of opposed legs, each of which may be in acute or square angular relationship with a center, transverse frame member. The frame also includes a pair of opposed second legs. Each of the second legs may be in obtuse or square angular relationship with the center member. The integral, unitary frame is substantially in the configuration of an H shape.

The web sling is located between the first pair of legs and the center frame member while the hoist ring is located between the second pair of legs and the center frame member.

The hoist ring fastening device includes a body which has an axial opening therethrough. The hoist ring also includes a lower bushing having an upper cylindrical projection which nests in the body axial opening. A threaded screw passes through the body axial opening and the cylindrical projection of the lower bushing and extends through the lower recess. The lower bushing also includes a lower recess into which is inserted a retaining ring.

The threaded shank of the screw will be connected to a load so that the screw may rotate or swivel 360° within the body of the hoist ring device.

The hoist ring also includes a pair of axially aligned pins, with each pin passing through an opening in the second legs. The pins also pass into bores in the ring body. The hoist ring is, thus, allowed to pivot 180° about the axis of the pins.

The web sling includes a clasp or spool having a central saddle to receive a fabric web. The spool has a central cylindrical opening which receives a bolt shaft. The bolt shaft also passes through a pair of openings in the first legs. The spool can, thus, rotate about the shaft axis. This allows the web sling to rotate with respect to the frame. The web sling shaft is parallel to and spaced from the center member of the frame.

The alignment of the hoist ring and web sling with the frame assists in concentrating the load toward the center of the hoist ring.

The connector provides an efficient connection between a hoist ring and a web sling.

BRIEF DESCRIPTION OF THE DRAWINGS

FIG. 2 is a sectional view of the hoist ring to web sling connector taken along section line 2—2 of FIG. 1;

FIG. 3 illustrates the connector of the present invention as shown in FIG. 2 with the hoist ring and web sling pivoted to illustrate movements which the connector is capable of;

DETAILED DESCRIPTION OF THE PREFERRED EMBODIMENTS

Figure 1:
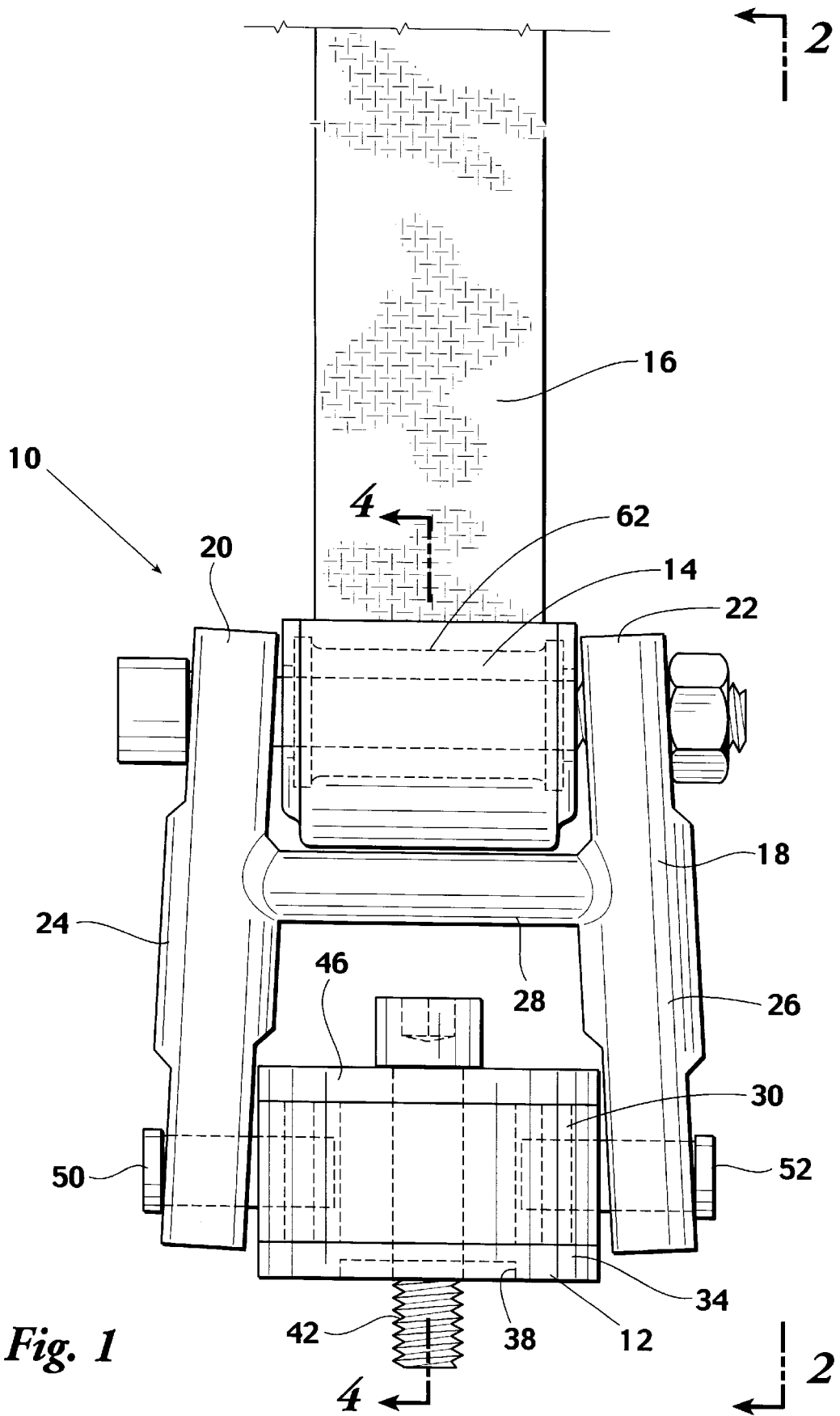
FIG. 1 is an elevational view of a hoist ring to web sling connector constructed in accordance with the present invention.

Referring to the drawings in detail, FIG. 1 is an elevation view of a hoist ring to web sling connector 10 constructed in accordance with the present invention. The connector includes a hoist ring fastening device 12 for receiving and connecting to a load (not shown) to be suspended. The connector also includes a web sling 14 which is adapted to receive and connect to a fabric web 16 (a portion of which is shown).

FIG. 2 illustrates a sectional view taken along section line 2—2 of FIG. 1, showing a side view of the connector 10.

FIG. 3 illustrates the connector 10 as shown in FIG. 2 illustrating an example of pivotal movement of the hoist ring 12 and pivotal movement of the web sling 14 of which the connector is capable of.

Figure 4:
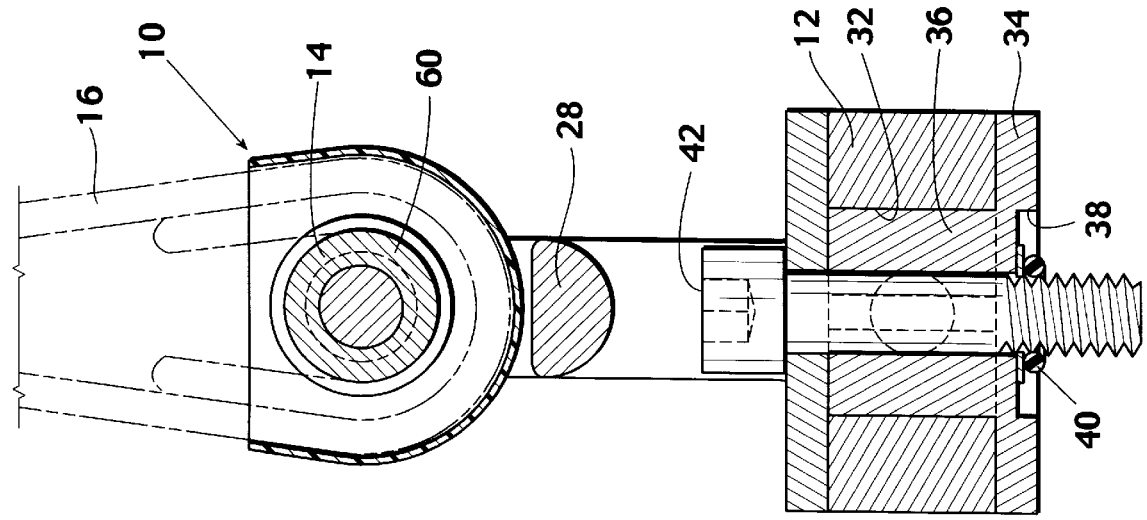
FIG. 4 is a sectional view of the connector of the present invention taken along section line 4—4 of FIG. 1.
Figure 5:
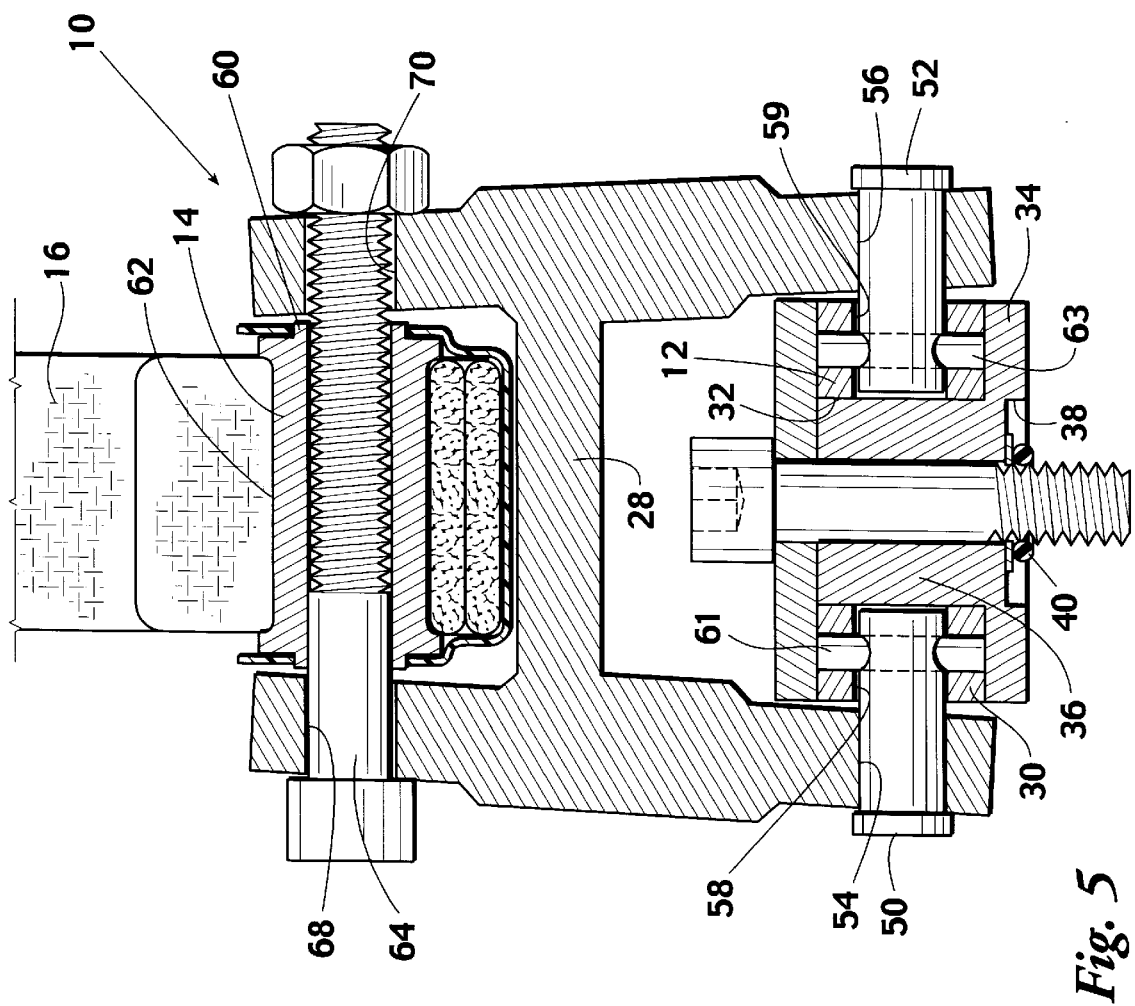
FIG. 5 is a sectional view of the connector of the present invention taken along section line 5—5 of FIG. 2.

FIG. 4 is a sectional view taken along section 4—4 of FIG. 1, while FIG. 5 is a sectional view taken along section 5—5 of FIG. 2.

The connector 10 includes a unitary, integral frame 18. The frame includes a first pair of opposed legs 20 and 22. Each of the first legs may be in an acute or square angular relationship with a center, transverse member 28 of the frame 18.

The connector 10 also includes a pair of opposed second legs 24 and 26. Each of the second legs 24 and 26 may be in an obtuse or square angular relationship with the center member 28 of the frame.

In the present embodiment, the first leg 20 is aligned with second leg 24 while the first leg 22 is aligned with second leg 26. The center member 28 is transverse to legs 20 and 24 and is also transverse to legs 22 and 26. Accordingly, the integral, unitary frame is substantially in the configuration of a modified H-shape.

As can best be seen in the embodiment in FIGS. 1 and 5, the aligned legs 20 and 24 are not parallel to aligned legs 22 and 26. Instead, the frame tapers toward the web sling 14 which is advantageous in concentrating the load toward the center of the hoist ring.

The web sling is located between the first pair of legs 20 and 22 and the center member 28 while the hoist ring is located between the second pair of legs 24 and 26 and the center frame member 28.

The hoist ring fastening device 12 can be readily appreciated from the sectional views in FIGS. 4 and 5.

The hoist ring fastening device 12 includes a body 30 which has an axial opening 32 therethrough. The hoist ring 12 includes a lower bushing 34 which has an upper cylindrical projection 36 which nests in the body axial opening 32. The lower bushing 34 also includes a lower recess 38. A retaining ring 40 is inserted within and resides within the lower recess 38. A self-locking retaining ring 40 may be used for this purpose.

A screw 42 passes through an upper washer 46, through the body axial opening 32 and the cylindrical projection 36, and extends through the lower recess 38. The screw 42 has a threaded shank 44. The threaded shank 44 will be connected to a load (not shown) so that the screw 42 may rotate or swivel 360° within the body.

The hoist ring 12 also includes a pair of axially aligned pins 50 and 52, with each pin passing through an opening 54 and 56, respectively, in the second legs 24 and 26. The pins 50 and 52 each also pass into bores 58 and 59, respectively, in the ring body 30 (best seen in FIG. 5). The pins 50 and 52 may be attached to the body by means of shear proof or roll pins 61 and 63. The hoist ring 12 is, thus, allowed to pivot 180° about the axis of the pins 50 and 52.

The axis of the pins 50 and 52 is transverse to the screw 42 of the hoist ring. The pins 50 and 52 are parallel to the center member 28 of the frame. FIG. 3 illustrates the body hoist ring 12 pivoted with respect to the frame 18.

The web sling 14 can also be seen from FIGS. 4 and 5. The web sling 14 includes a clasp or spool 60 having a central saddle 62. The central saddle receives the fabric web 16 or other flat cord or cable. The saddle 62 may be designed with a non-slip surface and may be sized to reduce any tendency of the fabric web 16 to slide. The spool 60 has a central cylindrical opening which receives a bolt having a shaft 64. The diameter of the spool opening is slightly larger than bolt shaft diameter The bolt shaft also passes through a pair of openings 68 and 70 in the first legs 20 and 22, respectively. The spool 60 can, thus, rotate around the shaft 64 about the shaft axis. As seen in FIG. 3, this allows the frame 18 to rotate with respect to the web sling 14, and vice versa.

The web sling 14 may also include a plastic cover shield 72 in an inverted bell shape surrounding the spool.

The web sling bolt shaft 64 is parallel to and spaced from the center member 28 of the frame. The center frame member 28 may, thus, also assist in retaining the web fabric 16 on the saddle.

The present connector 10 will, thus, allow the hoist ring shaft to be rotated with respect to the fabric web 16 a total of 360°. The present connector 10 is, thus, extremely versatile and will allow positioning of a fabric web sling 360° with respect to the load. The fabric web may also be positioned with respect to the load up to 180°.

In order to utilize the connector 10, initially, the proper size hoist ring 12 will be selected for the given load. This includes determining the proper type of screw threads, the working load limit of the hoist ring, the bolt diameter, effective thread length and length of bolt. After the proper hoist ring 12 has been selected, the load or work piece will be drilled and tapped to the correct size and to a minimum depth of at least one half the threaded shank diameter plus the threaded shank length. The hoist ring 12 will be installed or connected to the load so that the lower bushing face meets the face of the load or work piece and properly torqued to prescribed torque values.

The connector 10 will also be connected to the web sling. The bolt shaft and spool 60 may be removed from the frame to thread the fabric web 16 thereon. The bolt shaft and spool will thereafter be replaced for usage.

Figure 6:
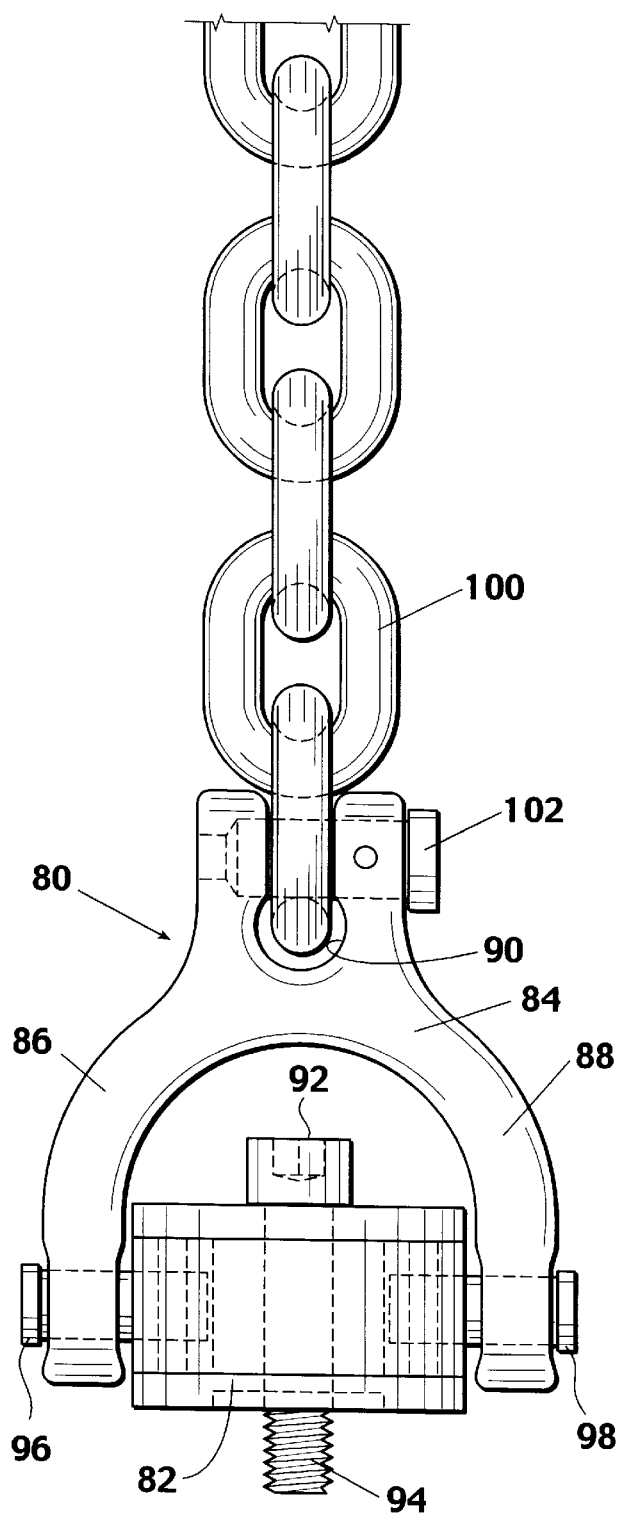
FIG. 6 is an elevational view and FIG. 7 is a side view of an alternate embodiment of a hoist ring to chain connector constructed in accordance with the present invention.
Figure 7:
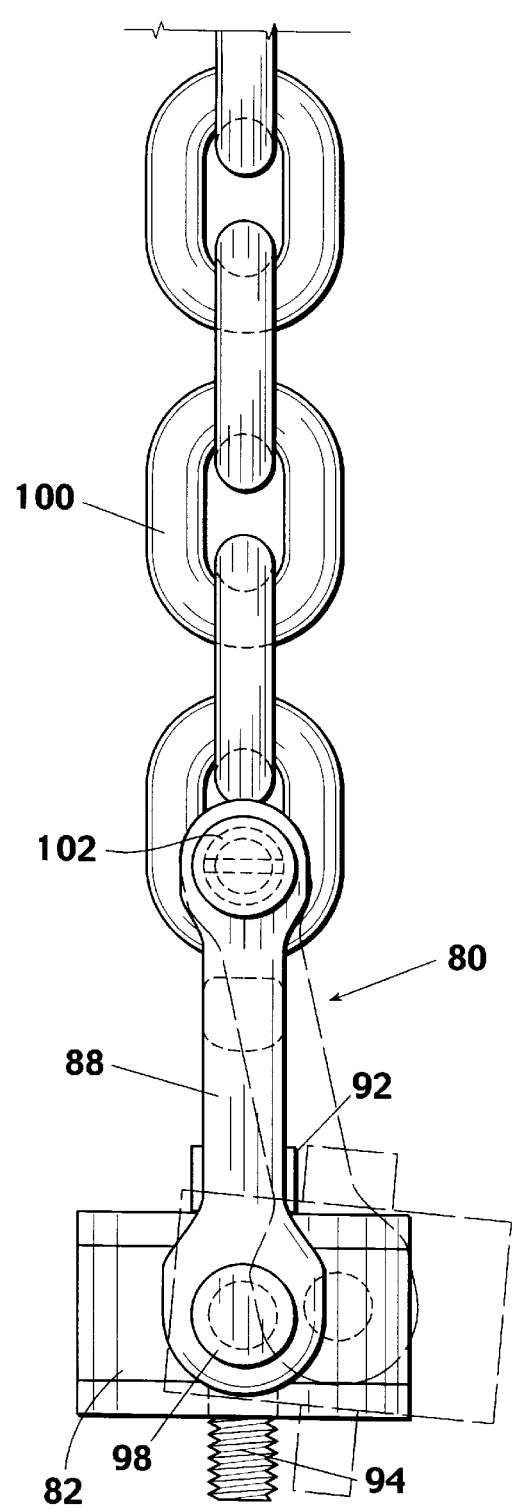

An alternate embodiment of the invention for a swivel hoist ring to chain connector is shown in FIGS. 6 and 7. A swivel hoist ring to chain connector 80 includes a hoist ring fastening device 82 for receiving and connecting to a load (not shown) to be suspended.

The connector 80 includes a unitary, integral frame 84. The frame includes a pair of opposed legs 86 and 88 which join together at one end.

The connector 80 also includes a frame channel 90. The opposed legs 86 and 88 taper towards each other and join at the frame channel 90. As previously described in the initial embodiment of the connector 10, the hoist ring fastening device 82 includes a screw 92 having a threaded shank 94 which will be connected to a load (not shown). To utilize the connector 80, the proper size hoist ring 82 will be selected for the given load. This includes determining the proper type of screw threads, the working load limit of the hoist ring, the bolt diameter, effective thread length and length of bolt.

The hoist ring 82 also includes a pair of axially aligned pins 96 and 98 which extend through openings in the legs to allow the hoist ring to pivot 180° about the axis of the pins 96 and 98.

The axis of the pins 96 and 98 is transverse to the screw 92 of the hoist ring. The frame channel 90 is designed to receive a chain 100 therein. A removable channel pin 102 secures the chain 100 within the frame channel. The channel 90 is spaced equidistant between the opposed legs 86 and 88 which is advantageous in concentrating the load (not shown) towards the center of the hoist ring 82.

Whereas, the present invention has been described in relation to the drawings attached hereto, it should be understood that other and further modifications, apart from those shown or suggested herein, may be made within the spirit and scope of this invention.

What is claimed is:

1. A hoist ring to web sling connector which comprises:
   a hoist ring having a screw with a threaded shank for receiving a load and a body which receives said screw therethrough;

a web sling including a spool having a saddle to receive a web fabric; and a frame having a first pair of legs connected to said sling spool and a second pair of legs which pivotally connect with said hoist ring body.

2. A connector as set forth in claim 1 wherein said first and said second pair of legs are coaxial with each other.

3. A connector as set forth in claim 2 wherein said frame includes a center member transverse to and joining together said first and said second pair of legs.

4. A connector as set forth in claim 3 wherein said web sling spool is parallel to and spaced from said center member.

5. A connector as set forth in claim 1 wherein said hoist ring body includes a lower bushing having a lower recess into which a retaining ring inserts.

6. A connector as set forth in claim 1 including a pair of pins, each said pin passing through an opening in one said second leg and into a bore of said body to allow said pivotal connection between said hoist ring body and said frame second legs.

7. A connector as set forth in claim 6 wherein said pins are parallel to a center member of said frame.

8. A hoist ring to web sling connector, which comprises:

an H-shaped frame having a first pair of opposed legs and a second pair of opposed legs;

a hoist ring having a body, said body pivotally connected to said second pair of legs; and a web sling having a spool having a saddle to receive a sling, wherein said spool is joined with said first pair of legs.

9. A connector as set forth in claim 8 wherein said H-shaped frame includes a center member transverse to said first and said second pair of legs.

10. A connector as set forth in claim 9 wherein said spool has an axis which is parallel to said center member.

11. A connector as set forth in claim 8 including a pair of pins, each said pin passing through an opening in one said second leg and passing into a bore of said body.

12. A connector as set forth in claim 11 wherein said pins have an axis which is parallel to a center member of said frame.

13. A hoist ring to sling connector which comprises:

a frame having a first pair of opposed legs, each said first leg in acute angular relationship with a center member, and a second pair of opposed legs, each said second leg in obtuse angular relationship with said center member;

a sling connected to said first pair of opposed legs; and a hoist ring pivotally connected to said second pair of opposed legs.

14. A connector as set forth in claim 13 wherein said first and said second pair of legs are aligned with each other.

15. A connector as set forth in claim 13 including a shaft passing through an opening in each said first leg and including a saddle on said shaft between said first legs, said saddle rotatable about said shaft.

\* \* \* \* \*